United States Patent
Cheung

(10) Patent No.: US 8,924,579 B2
(45) Date of Patent: Dec. 30, 2014

(54) DATA STREAMING METHOD

(75) Inventor: Gene Cheung, Tokyo (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 1573 days.

(21) Appl. No.: 12/020,816

(22) Filed: Jan. 28, 2008

(65) Prior Publication Data

US 2008/0183886 A1 Jul. 31, 2008

(30) Foreign Application Priority Data

Jan. 31, 2007 (JP) .................. 2007-022454

(51) Int. Cl.
*G06F 15/16* (2006.01)
*H04L 29/06* (2006.01)

(52) U.S. Cl.
CPC .............. *H04L 65/607* (2013.01); *H04L 65/80* (2013.01); *H04L 29/06027* (2013.01)
USPC ......................................... 709/231; 709/227

(58) Field of Classification Search
USPC ................................ 709/231, 227
See application file for complete search history.

(56) References Cited

U.S. PATENT DOCUMENTS

| | | |
|---|---|---|
| 2003/0227566 A1 | 12/2003 | Takenaka |
| 2006/0143678 A1* | 6/2006 | Chou et al. .................... 725/118 |
| 2008/0080568 A1* | 4/2008 | Hughes et al. ................ 370/519 |

FOREIGN PATENT DOCUMENTS

| | | |
|---|---|---|
| JP | 2003-163691 | 6/2003 |
| JP | 2003-179662 | 6/2003 |
| JP | 2004-015318 | 1/2004 |
| JP | 2004-080145 | 3/2004 |

OTHER PUBLICATIONS

Li et al. Joint Server/Peer Receiver-Driven Rate-Distortion Optimized Video Streaming Using Asynchronous Clocks [online], 2004 [retrieved on Sep. 30, 2009]. Retrieved from Internet:<URL: http://www.hpl.hp.com/personal/Gene_Cheung/icip04_davis.pdf>.*
Chakareski, J. et al. "Server Diversity in Rate-Distortion Optimized Media Streaming", IEE International Conference on Image Processing. Sep. 2003. Retrieved from Applicant's IDS filed Jan. 28, 2008.*
Nguyen, T. P. et al. "Distributed Video Streaming Over Internet", SPIE Multimedia Computer and Networking. Jan. 2002. Retrieved from Applicant's IDS filed Jan. 28, 2008.*
Chakareski, J. et al., "Server Diversity in Rate-Distortion Optimized Media Streaming", IEEE International Conf. on Image Processing, Sep. 2003.
Chou, P.A. et al., "Rate-Distortion Optimized Streaming of Packetized Media", IEEE Transaction on Multimedia, vol. 8, No. 2, Apr. 2006.
Mar, S.F. et al., "Equation-Based Congestion Control for Unicast Applications", SIGCOMM 2000, May 2000.
Nguyen, T. P. et al., "Distributed Video Streaming Over Internet", SPIE Multimedia Computer and Networking, Jan. 2002.
Rejaie, R. et al., "PALS: Peer-to-Peer Adaptive Layered Streaming", NOSSDAV'03, ACM Jun. 2003.

(Continued)

*Primary Examiner* — Tonia L Dollinger
*Assistant Examiner* — Adam Cooney

(57) ABSTRACT

Data paths extending to a first receiver from a plurality of data supply sources are each capable of supplying the same stream data. When providing the stream data to the first receiver rate-distortion of the data paths is optimized. Clocks asynchronous with each other per data path are set so as to attain the rate-distortion optimization.

2 Claims, 5 Drawing Sheets

(56) References Cited

OTHER PUBLICATIONS

English translation (machine-generated) of Abstract from Japanese Patent Publication No. 2003163691 [retrieved on Aug. 8, 2014], Retrieved from the Internet: <http://worldwide.espacenet.com/publicationDetails/biblio?CC=JP&NR=2003163691A&KC=A&FT=D&ND=3&date=20030606&DB=worldwide.espacenet.com&locale=en_EP>.

English translation (machine-generated) of Abstract from Japanese Patent Publication No. 2003179662 [retrieved on Aug. 8, 2014], Retrieved from the Internet: <http://worldwide.espacenet.com/publicationDetails/biblio?CC=JP&NR=2003179662A&KC=A&FT=D&ND=3&date=20030627&DB=worldwide.espacenet.com&locale=en_EP>.

English translation (machine-generated) of Abstract from Japanese Patent Publication No. 2004015318 [retrieved on Aug. 8, 2014], Retrieved from the Internet: <http://worldwide.espacenet.com/publicationDetails/biblio?CC=JP&NR=2004015318A&KC=A&FT=D&ND=3&date=20040115&DB=EPODOC&locale=en_EP>.

English translation (machine-generated) of Abstract from Japanese Patent Publication No. 2004080145 [retrieved on Aug. 8, 2014], Retrieved from the Internet: <http://worldwide.espacenet.com/publicationDetails/biblio?DB=worldwide.espacenet.com&II=0&ND=3&adjacent=true&locale=en_EP&FT=D&date=20040311&CC=JP&NR=2004080145A&KC=A>.

* cited by examiner

DATA STREAMING METHOD

CLAIM FOR PRIORITY

This patent application claims priority under 35 U.S.C. §119(a) on Patent Application No. 2007-022454 filed in Japan on Jan. 31, 2007, the entire contents of which are hereby incorporated by reference.

TECHNICAL FIELD

The embodiments of the present invention relate to a data streaming method of transferring one category of data stream of video data to one receiver from a plurality of servers and other stream senders retaining the data stream, and more particularly, to optimization of efficiency on this occasion.

BACKGROUND

Over the recent years, there have been increasing demands for a high-quality and broadband video stream via a wireless network. Because of the essence of the wireless network, however, there arise problems that have occurred in the case of transmitting the same multimedia content via a conventional wired network. Among others, a serious problem is that video quality undergoing an end-to-end observation largely fluctuates due to time-varying channel fading and a relatively high bit error rate. Moreover, access speeds from clients vary widely.

SUMMARY

According to an embodiment, a highly-efficient data streaming method provides a category of data stream which is subjected to rate-distortion optimization is sent to a single receiver via a plurality of data supply sources. In order to accomplish this, the data streaming method involves conducting multiple path/data streaming/scheduling in a state of performing the rate-distortion optimization.

According to an embodiment, a data streaming method includes establishing data paths extending to a first receiver from a plurality of data supply sources each capable of supplying the same category of stream data, respectively; and performing rate-distortion optimization of the plurality of data paths to provide the stream data to the first receiver, wherein mutually asynchronous clocks are set for the respective data paths so as to attain the rate-distortion optimization.

Further, each of the plurality of data supply sources may be configured to include a server which stores the data stream.

Further, the plurality of data supply sources may be configured to include another receiver which receives the data stream.

Further, a difference between a position in the data stream that is now reproduced by the another receiver and a position in the data stream that is watched/listened by the first receiver may be set to be equal to or smaller than a predetermined value.

Further, a change in parameter affecting influence the asynchronous clock may be detected to recalculate the asynchronous clocks.

The data streaming method is capable of transferring one category of stream data to a receiver via the respective data paths, while reducing the distortion, from a plurality of servers by making best use of the bandwidth of each path.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Figure 1:
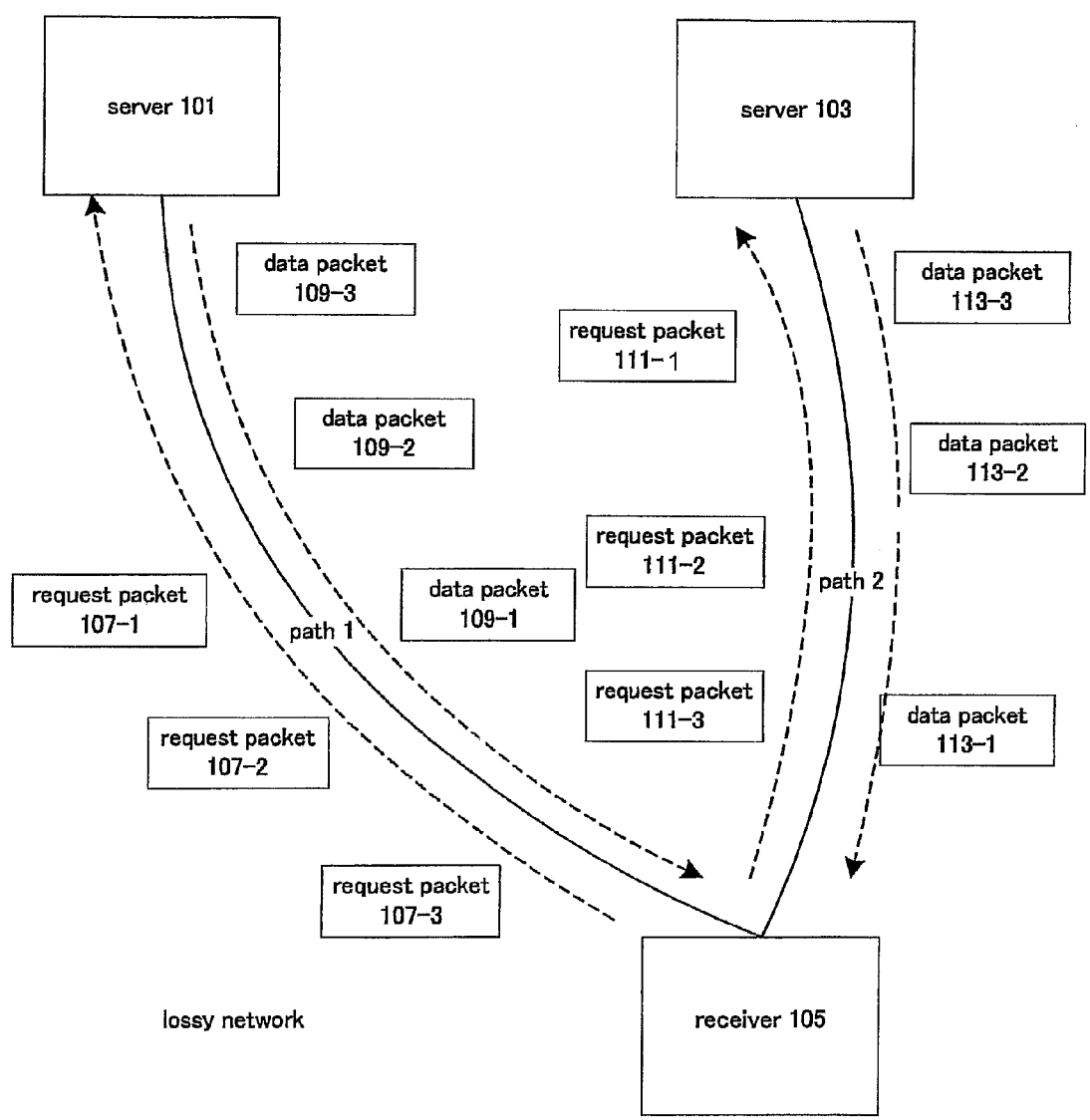
FIG. 1 illustrates a diagram showing a network, according to an embodiment.

FIG. 1 is a diagram showing a system performing data streaming from a plurality of data supply sources (in this case, servers) to a receiver via a plurality of data paths on a lossy network. Referring to FIG. 1, servers 101 and 103 capable of supplying stream data and a receiver 105 supplied with the stream data from those servers are provided in the lossy network. Those servers 101 and 103 are stored with the same category of stream data. The receiver 105 is supplied with the stream data via a data path 1 and a data path 2 established between those servers and the receiver 105.

To be more specific, the receiver 105 receives one category of data stream such as video. When receiving the data stream, normally the receiver establishes the data path between the single server and the receiver itself and is thus supplied with the data stream therefrom. Herein, however, the receiver 105 establishes the data paths between the plurality of servers and the receiver 105, respectively. In FIG. 1, the data paths 1 and 2 are established between the two servers 101 and 103, and the receiver 105, respectively. However, as a matter of course, any number of servers establishing the data paths may be set according to the necessity.

Thus, the receiver 105 that has established the data paths with the respective servers, when receiving one category of data stream, determines from which server each of contents of the stream data should be acquired. The receiver 105 sends, based on a result of this determination, data request packets 107-1, 107-2, 107-3, . . . , 111-1, 111-2, 111-3, . . . to the determined servers via the data paths corresponding thereto. The servers 101 and 103 that have received those data request packets send, in response to those requests, data packets 109-1, 109-2, 109-3, . . . , 113-1, 113-2, 113-3, . . . to the receiver 105.

Needless to say, generally a plurality of data packets is sent to the receiver in response to one data request packet. Accordingly, it should be noted that branching numbers -1, -2, -3, . . . of the reference numbers of the data request packets 107-1, 107-2, 107-3, . . . , 111-1, 111-2, 111-3 are the same as branching numbers -1, -2, -3, . . . of the reference numbers of the data packets 109-1, 109-2, 109-3, . . . , 113-1, 113-2, 113-3, . . . , which does not imply any corresponding relationship therebetween in the sense of a response-to-request relationship. Further, the data streaming itself and a scheme how to realize the data streaming on a computer network are matters known to those skilled in the art. Hence, specific implementation of the content explained at the high-order level with reference to FIG. 1 is not herein described in order to avoid intricacy.

It has become increasingly important to transmit the stream data of the video etc. to mobile equipment via a wireless network such as a wireless local area network. In this type of connection via the wireless network, the stream data is transmitted via a wired network up to a wired-wireless network interface such as an access point from the server, and the wireless network connection is established from this interface to the mobile equipment. The wireless network involves using, e.g., 802.11b etc.

In the following, how the receiver 105 determines the recipient server to which the data request packets for each of the contents of the data stream should be sent, will be specifically described.

In the following description, a video source is exemplified as stream data, and the video source is modeled using a directed acyclic graph (DAG) $G=(v, \epsilon)$ with vertex set v and edge set $\epsilon$. Each frame i is represented by a data unit $DU_i$. The data unit is the smallest granularity which is considered in the optimization. Each edge $e_{i \to j}$ from $DU_i$ to $DU_j$ indicates that correct decoding of $D_i$ depends on the correct decoding of $D_j$. Each $DU_i$ has three associated constants: size of $DU_i$ in RTP packets $n_i$, playout buffer deadline $T_i$, and reduction in distortion $D_i$. $T_i$ is the time by which $DU_i$ must reach the client and be decoded for use. $D_i$ is the amount of the distortion reduction at the receiver if the $DU_i$ is decoded correctly on time.

For each sender-receiver pair, the following channel model is constructed to model loss and delay. First, a round-trip packet loss is defined by subtracting the probability that a transmission request packet is correctly received and the requested packet is correctly delivered from 1. Similarly, a round-trip packet delay is defined as the sum of the delay of a request packet being sent from the receiver to the sender and the delay of the requested packet being sent from the sender to the receiver, when neither the request packet nor the requested packet are lost. For round-trip packet loss, a time-invariant packet erasure model is used as parameter.

$$\epsilon_j \qquad \text{Equation 1}$$

As for peer-to-peer connection, the loss rate is likely much higher due to unpredictability of mobile user movement. For round-trip packet delay, an exponential distribution is used in this case.

$$f_j(x) = \gamma_j e^{-\gamma_j x}, x \geq 0 \qquad \text{Equation 2}$$

A request packet sent by the receiver at time T causes a requested packet to arrive at receiver by time T' with probability $p_j(T'-T)$.

Equation 3

$$p_j(T' - T) = (1 - \varepsilon_j) \int_0^{T'} f_j^{-T}(x)\, dx \qquad (1)$$

As for the server-receiver connection using 802.11b infrastructure mode, because the connection travels through the Internet, the connection needs to be TCP-friendly. In order not to claim more bandwidth than what a normal TCP connection would use under the same network condition, the data units to be transmitted need to be spaced by $\Delta_0$ using a well-known TCP-friendly congestion control equation:

Equation 4

$$\Delta_0 = \mu_0 \sqrt{2\alpha_0/3} + 3(\mu_0 + 4\sigma_0)\alpha_0(1+32\alpha_0^2)\sqrt{3\alpha_0/8} \qquad (2)$$

where $\mu_0$ and $\sigma_0^2$ are the estimated mean and variance of round trip time (RTT) for the link between the server-receiver pair, respectively.

As for the peer-receiver connections using IEEE802.11b ad-hoc mode, while wireless LAN can support a high constant transfer rate exceeding the streaming rate of the video, it is assumed that fairness needs to be enforced using ad-hoc mode in this case. One policy to guarantee fairness among peers is to enforce fixed transmission slots with staggered starting time, where a peer j can only send packet at time $tj+m\delta_j$, $m \in I$ during ad-hoc mode. Herein, it is assumed that such a policy is used.

In the following, the joint server/peer streaming problem is formalized as a formal combinatorial optimization problem. First, it is assumed that the optimization is performed every $P_o$ seconds, and at a given optimization instant t, N data units in a selected optimization window are under consideration for (re) transmission. As output of the optimization, the algorithm must decide the transmission strategy for the upcoming $P_0$ seconds.

The rate-distortion optimized streaming problem is formulated as follows. As for each $DU_i$ in the optimization window, a transmission request policy $\pi_i$ and a transmission request policy vector $\pi = [\pi_1 \ldots, \pi_N]$ for all N data units are defined. It is assumed that transmission policy is composed of two parts, $\pi_i = \{h_i, c_i\}$, where $h_i$ is transmission history of $DU_i$ and $c_i$ is the transmission decision taken during optimization at instant t. More precisely, it is written as follows:

Equation 5

$$h_i = \{(t_i^{(1)}, s_i^{(1)}), \ldots, (t_i^{(l_i)}, s_i^{(l_i)})\} \qquad (3)$$

where $l_i$ is the number of previous transmission request attempts, and $t_i^{(k)}$ and $s_i^{(k)}$ are the timestamp and sender ID of attempt k, respectively. Sender ID $s_i(k)$ identifies the sender to which the request packet has been sent at attempt k, where $s_i(k) \in \Omega = \{0, \ldots, M-1\}$.

Transmission decision $c_i$ determines the transmission request strategy for $DU_i$ during the next $P_0$ seconds. It is defined similar as $h_i$:

Equation 6

$$c_i = \{(\tau_i^{(1)}, \xi_i^{(1)}), \ldots, (\tau_i^{(z_i)}, \xi_i^{(z_i)})\} \qquad (4)$$

Where $Z_i$ is the number of transmission requests to be sent in the next $P_0$ seconds, and $\tau_i^{(k)}$ and $\xi_i^{(k)}$ are similarly defined quantities as $t_i^{(k)}$ and $s_i^{(k)}$ in (3).

Now, the probability $q_i(\pi_i)_i$ that $DU_i$ is received correctly and on time when transmission request policy $\pi i$ is given.

Equation 7

$$q_i(\pi_i) = 1 - \prod_{k=1}^{l_1} \left(1 - p_{s_i^{(k)}}\left(T_i - t_i^{(k)}\right)\right) \prod_{k=1}^{z_1} \left(1 - p_{\xi_i^{(k)}}\left(T_i - t_i^{(k)}\right)\right) \qquad (5)$$

Given probability $q_i(\pi_i)$ of each $DU_i$ and the DAG source model, a resulting expected distortion of a group of N data units under transmission request policy vector $\pi$ is deduced as:

Equation 8

$$D(\pi) = \left\{ D_0 - \sum_{i=1}^{N} d(\pi_i) \prod_{j \leq i} q_j(\pi_j) \right\} \quad (6)$$

where $$j \leq i \quad \text{Equation 9}$$

denotes the set of $DU_j$'s that preceed or equal $DU_i$ in DAG G.

Given the optimization period $P_0$, the M rate constraints for the M sender-receiver pairs can be simply constructed as follows.

$$W_j = \lfloor P_0/\Delta_j \rfloor \quad \text{Equation 10}$$

For each sender-receiver pair j, $P_0$ yields transmission opportunities until the next optimization instant $t+P_0$. Having $W_j$'s, the rate constraints are as follows:

Equation 11

$$\sum_{i=1}^{N} R_j(c_i) \leq W_k \quad (7)$$

$$J = 0, \ldots, M-1$$

$$R_j(c_i) = \sum_{k=l}^{z_1} n_i \delta(\zeta^{(k)} - j)$$

where $\delta(x)$ is the delta function: $\delta(x)=1$ if $x=0$, and 0 otherwise. If sender-receiver pair j is selected at attempt k of $DU_i$, i.e. $\xi_i^{(k)}=j$, the request time must be one of the transmission opportunities of pair j, i.e.:

Equation 12

$$\tau_i^{(k)} \in \{t + m\Delta_j, m \leq W_j\} \quad (8)$$

The optimization problem is to find $c_i$'s of $DU_i$'s in policy vector $\pi$ such that (6) is minimized subject to the M constraints (7) and (8).

Solving the rate distortion optimization problem defined by (6) given (7) and (8) is extremely difficult. Instead, the problem is simplified as follows: assuming that optimization period can be permitted to vary $P_0$ as often as wanted, $P_0$ can be set to be exactly the amount of time until the next transmission opportunity of any sender-receiver pair becomes available. In one implementation, at start time t, no requests are sent and $P_0$ is set as follows:

Equation 13

$$P_0 = \min\{\Delta_0, \ldots, \Delta_{M-1}\} \quad (9)$$

$$\Delta_j = \arg\min\{\Delta_0, \ldots, \Delta_{M-1}\} \quad (10)$$

The second equation described above means obtaining a variable name (i.e., not a value as a numerical value but a symbol thereof) of the value to give a minimum value within right-side parentheses of min. For example, when $\Delta_0=1$, $\Delta_1=2$, and $\Delta_2=0$, arg min $\{\Delta_0, \Delta_1, \Delta_2\}$ gives $\Delta_2$.

At $t+P_0=t+\Delta_j$, one transmission opportunity of sender-receiver pair j is immediately available, so one data unit (to be discussed) is exactly selected to request from sender j. We then set the next optimization period $P_1$ as:

Equation 14

$$P_1 = \min\{\Delta_0 - \Delta_j, \ldots, \Delta_j, \ldots, \Delta_{M-1} - \Delta_j\} \quad (11)$$

It should be noted that a term with respect to a sender-receiver pair j remains to be $\Delta_j$. With repetitions of this process, and in each repetition, one data unit is selected for every now-immediately-usable transmission opportunity of the sender-receiver pair.

The process described above is equivalent to setting an asynchronous clock group, i.e., M-pieces of asynchronous clocks, in which each clock j is biased at intervals of $\delta_j$ sec. Each time the clock j rises, it is notified that there is the now-immediately-usable transmission opportunity with respect to the sender-receiver pair j. Such being the case, the data unit, which should be requested of the sender (transmission side) j, is selected, and next, this clock is fallen and is biased next time after $\Delta_j$ sec.

In the above formulation, this process implies that one of a single group of Wk is set to 1 while the remaining is set to 0, and the transmission determining length $z_i$ of $Du_i$ is all set to 1. The selection on the transmission side for every biasing of the clock can be automatically performed by use of an optimization-related time differential method. In addition, the problem to be solved herein can be restored to a much simpler issue of the point-to-point rate-distortion optimized streaming, which will be described in the following.

If the sender j defined as the data transfer request target is selected when the clock j is biased, the problem currently described is simplified into the issue of the point-to-point rate-distortion optimized streaming. To summarize, the optimal data unit $Du_i$ of the transmission is the data unit having the maximum $\lambda_i = \lambda_i' S_i / B_i$, where $\lambda_i'$ and $S_i$ are given as in the following equation.

Equation 15

$$\lambda_i' = q_i(\pi_{i,0}) - q_i(\pi_{i,1}) \quad (12)$$

$$S_i = \sum_{k \geq i} D_k \prod_{\substack{j \leq k \\ j \neq i}} (1 - q_j(\pi_j)) \quad (13)$$

Herein, $\pi\{_{i,1}\}=\{h_i, (j, t)\}$ is a transmission policy of $Du_i$ when the transmission request is sent to the sender j at timing t. Further, $\pi\{_{i,0}\}=\{h_i\}$ is a policy of $Du_i$ when none of the request is sent at the timing t.

The data transfer scheduling of each of the servers can be thus conducted on the occasion of transferring the data stream via M-lines of data paths to the single receiver from M-pieces of servers.

On the occasion of performing this type of transfer, if another receiver (referred to as a [peer] in the above description) exists in the vicinity and if the same category of data stream is transferred to this peer receiver, a transfer path extending from another receiver is set up for the data transfer target receiver under consideration, whereby part of the stream data can be transferred from this neighboring receiver as well as from the server. The data transfer with respect to the neighboring receiver receiving the same category of stream data can be realized by employing an ad-hoc mode according to, e.g., IEEE802.11b. If the stream data can be transferred from another neighboring receiver, and especially when a preferable-communications-enabled condition such as a short distance from the neighboring receiver is established, there is a possibility that the higher-speed transfer with the same distortion than in the case of transferring the data via the data path from the server can be realized.

The receiver, even when receiving the data stream, however, does not permanently retain the data stream for the reason that a data size of the data stream is large, and there is a possibility of unauthorized usage such as illegally copying the data if the received data stream is influentially set storable. Taking the video stream for example, if the frame screened on the receiver side is assured to be thereafter retained during a predetermined period of time, the receiver desiring to receive the transfer of the stream data accesses the server retaining the stream data, and simultaneously queries the neighboring receiver, and if it is known that the neighboring receiver retains the desired stream data, sets up the data path. In this way, a plurality of data paths extending to the single receiver (one or more servers and equal to more than zero piece of neighboring receiver) is set up.

In the following, a procedure of how the mobile receiver receives the stream data by use of the plurality of data paths will be explained more specifically with reference to a flowchart of FIG. 2.

Figure 2:
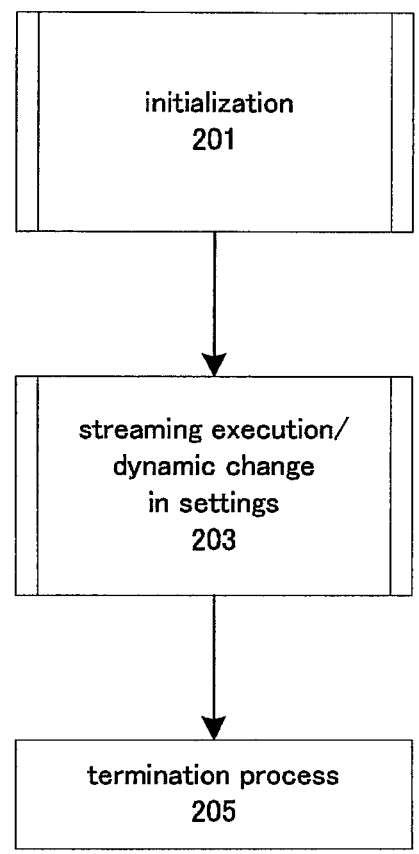
FIG. 2 illustrates a flowchart showing an outline of an operation of a mobile terminal, according to an embodiment.

FIG. 2 is a flowchart showing an outline of an operation of the receiver for implementing the data streaming according to an embodiment of the present invention. Herein, a mobile terminal is assumed as the receiver. Also, it is assumed that the receiver operates in a way of taking account of a possibility in which there exists another neighboring mobile terminal receiving the same category of stream data.

Figure 3:
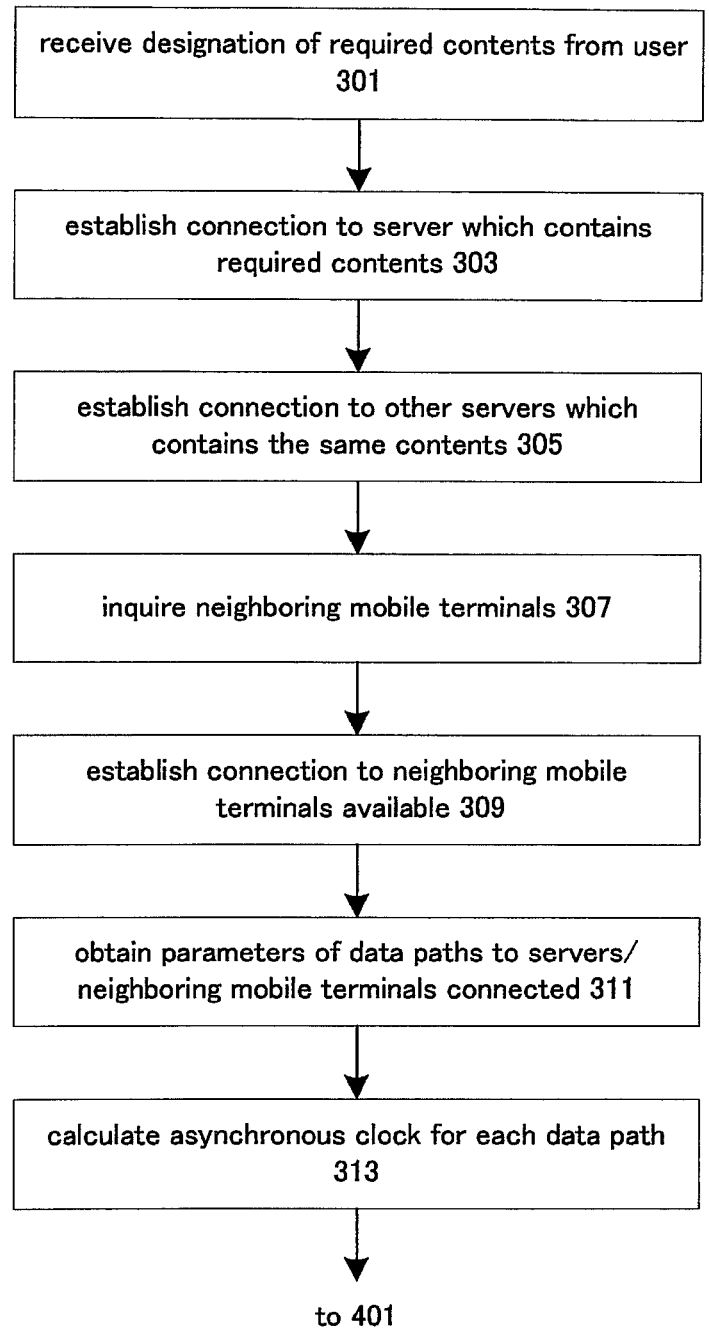
FIG. 3 illustrates a flowchart showing a detailed operation of the mobile terminal, according to an embodiment.

Carried out in initialization step 201 is an operation just before starting the streaming since the user of the mobile terminal has designated a data stream, which the user wants to receive, in the mobile terminal. A flowchart of FIG. 3 shows a more detailed operation in initialization step 201. It should be noted that an operation of designating a content (such as audio-video receiving) which a person wants to reproduce in the mobile terminal normally involves an intermediary of a person. However, operations in steps subsequent to this operation are, unless otherwise specified, namely, automatically conducted by software and/or hardware in the computer.

In initialization step 201, to begin with, the desired content designated by the user in step 301 is received. Next, the connection with the server having the desired content is established. On the occasion of establishing this connection, the user may directly include, in the designation, a piece of information for identifying the server (i.e., specifying which location within the server the desired content exists) such as URL of the desired content. Alternatively, the mobile terminal may retain connecting destination information from a name, a number, etc. of the content designated by the user, or a directory for searching for locating information on the network from the name, the number, etc. of the content may be set on the network.

Further, in step 305, the connection with another server having the same content is established. As in the case of the server establishing the connection in step 303, the user may designate another server, or the mobile terminal may retain the information on this server, or the information thereof may also be acquired from the directory on the network. Alternatively, the server establishing the connection in step 303 may provide the locating information on such other servers in the process of negotiations for establishing the connection.

In step 307, other mobile terminals existing in the vicinity are queried. If the mobile terminal retaining the data stream of the same content exists, the connection with this mobile terminal is established in step 309. On the occasion of this connection, for example, if a difference between a time position (i.e., position moved farther from the head of the data stream, in which the mobile terminal now audio/video-receives (views) this data stream) in the data stream viewed at the present by another peer mobile terminal and the present time is equal to or smaller than a predetermined value, it may be determined that the connection with another mobile terminal can be established.

Figure 4:
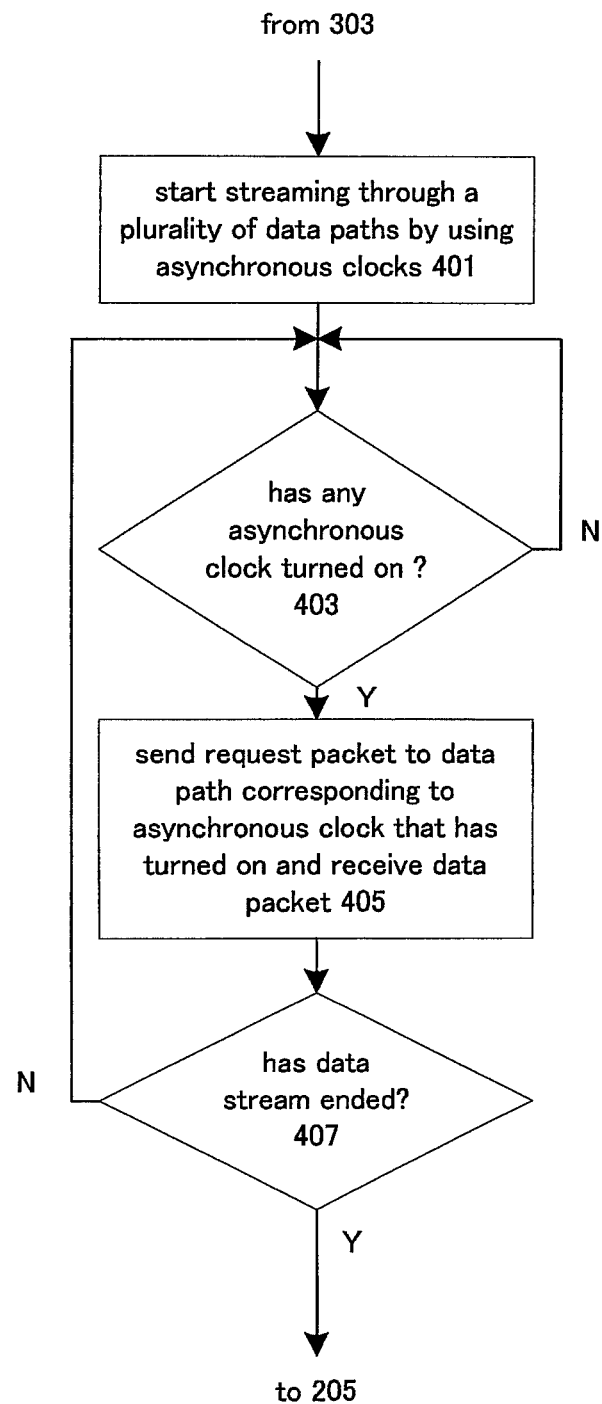
FIG. 4 illustrates a flowchart showing the detailed operation of the mobile terminal, according to another embodiment.

Next, in step 311, required parameters of the connected server and the neighboring mobile terminals are required, and in step 313, the asynchronous clocks per data path are calculated by the already-explained method. Thereafter, the operation moves to step 401 (FIG. 4), which is the head of step 03 where the streaming execution/dynamic change in settings is carried out.

In step 401, the streaming is started via the plurality of data paths by use of one group of asynchronous clocks, which have been calculated earlier. That is, it is checked in step 403 which asynchronous clock is set ON. If the asynchronous clock set ON exists, the operation proceeds to step 405, in which the request packet (FIG. 1) is sent along the corresponding data path and the data packet to be sent back are received. If none of the asynchronous clocks are set ON, the determination process in step 403 is repeated. In the above discussion, it is checked by polling whether the asynchronous clock is set ON or not, but an available scheme is that the processes of step 405 and the following steps may be started up through an event occurring just when the asynchronous clock is set ON by use of the hardware and firmware.

After receiving the data packets, it is determined in step 407 whether or not the data stream is terminated, i.e., the data stream is received to the last. If the data stream is received to the last, the operation moves to a termination process 205, where the necessary process is executed, and the reception of this data stream is terminated. On the other hand, if the data stream is not terminated yet, the operation returns to the determination step 403.

During a period of receiving the data stream, for example, it might happen that a parameter of a packet loss rate of the like fluctuates, and a disconnection occurs in an extreme case due to a movement of the mobile terminal and changes in other statuses of the wireless communications, or due to a variety of failures and a change in status of congestion also on the fixed network side. Further, other mobile terminals might interrupt the streaming. Alternatively, the reproducing position of the mobile terminal supplied with the data stream might catch up with other mobile terminals because of fast-forwarding the content in the process of being played back. Therefore, also during the reception, it is necessary, in step 501 of FIG. 5, to check the changes in those parameters at a certain frequency. Alternatively, in order to cope with an abrupt disconnection, there might also be a case not only of having a necessity for periodically starting up the process of FIG. 5, but also of starting up this process from step 501 upon an event caused by an external factor such as the disconnection.

Figure 5:
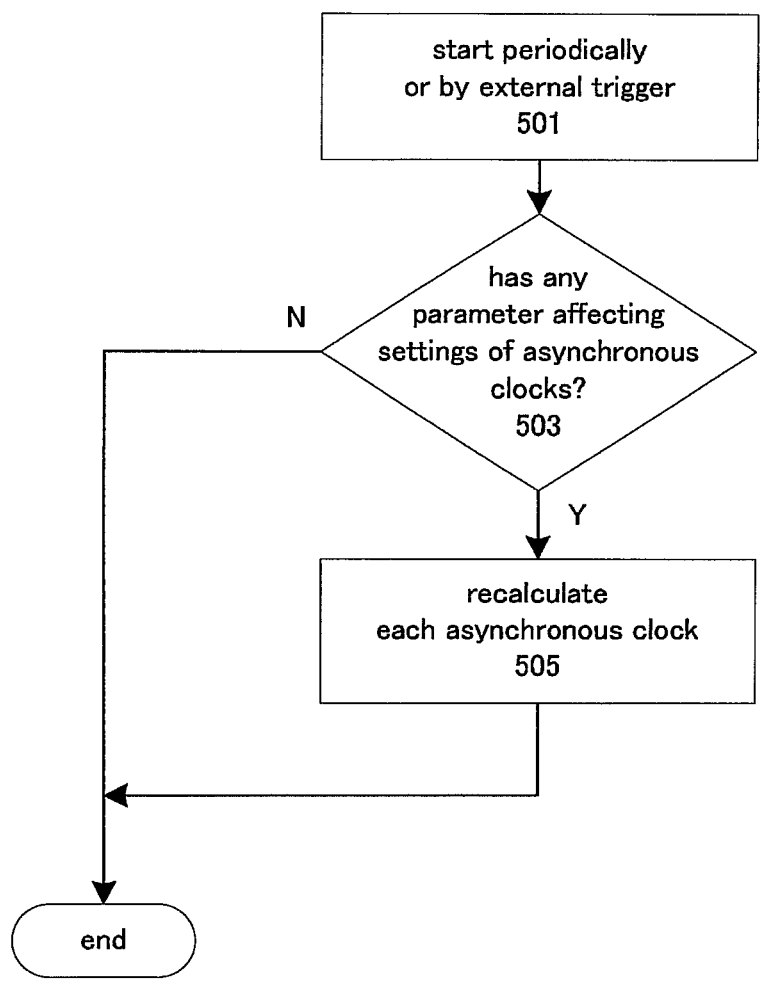
FIG. 5 illustrates a flowchart showing the detailed operation of the mobile terminal, according to another embodiment.

When the process in FIG. 5 is thus started up, next, it is checked in step 503 which parameter exerting influence on the asynchronous clock changes. In the case of detecting a change in the parameter by which the asynchronous clock fluctuates more greatly than some extent, the asynchronous clock is recalculated in step 505 and is used in the subsequent process in FIG. 4.

Note that, for example, the packet loss rate is always observed on the side of the mobile terminal, and the required parameters can be acquired from the wired/wireless interface and the server as well. Moreover, the disconnection is detected by the mobile terminal. If the recalculation (or first calculation) of the asynchronous clock has a large burden on the mobile terminal in terms of a calculation load, a memory capacity, etc., it is also possible to take a scheme that the calculation is performed by the wired/wireless gateway and the server, and a result of the calculation is transferred to the mobile terminal.

One or more of the steps described herein may be implemented as software embedded on a computer readable medium, such as memory, and executed for example, by a processor. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the scope of the claimed embodiments.

What is claimed is:

1. A data streaming method comprising:
    establishing a plurality of data paths extending to a first receiver respectively from a plurality of data, supply sources, each of said data supply sources being capable of supplying the same stream data to the first receiver, wherein the data supply sources include another receiver, and wherein establishing the plurality of data paths includes establishing a data path between the another receiver and the first receiver when a difference between a position in said stream data that is being reproduced by said another receiver and a position in said stream data that is being reproduced in said first receiver is equal to or smaller than a predetermined value; and
    performing rate-distortion optimization of said plurality of data paths to provide said stream data to said first receiver, wherein mutually asynchronous clocks are set for said respective data paths to attain said rate-distortion optimization,
    said plurality of data supply sources further eludes a first server which stores said stream data, and
    establishing said plurality of data paths comprises accessing the first server which stores said stream data and simultaneously querying said another receiver as to whether said another receiver has said stream data.

2. A non-transitory computer-readable medium on which is embedded one or more computer programs, said computer programs, when executed by a processor, implementing a method for streaming data to a first receiver, said computer programs comprising a set of instructions for:
    establishing a plurality of data paths extending to the first receiver respectively from a plurality of data supply sources, each of the data supply sources being capable of supplying the same stream data to the first receiver, wherein the data supply sources include another receiver, and wherein establishing the plurality of data paths includes establishing a data path between the another receiver and the first receiver when a difference between a position in said stream data that is being reproduced by said another receiver and a position in said stream data that is being reproduced in said first receiver is equal to or smaller than a predetermined value; and
    performing rate-distortion optimization of the plurality of data paths to provide the stream data to the first receiver, wherein mutually asynchronous clocks are set for the respective data paths to attain the rate-distortion optimization,
    the plurality of data supply sources further include a first server which stores the stream data, and
    establishing the plurality of data paths comprises accessing the first server which stores the stream data and simultaneously querying the another receiver as to whether the another receiver retains the stream data.

\* \* \* \* \*

UNITED STATES PATENT AND TRADEMARK OFFICE
CERTIFICATE OF CORRECTION

PATENT NO. : 8,924,579 B2
APPLICATION NO. : 12/020816
DATED : December 30, 2014
INVENTOR(S) : Gene Cheung et al.

It is certified that error appears in the above-identified patent and that said Letters Patent is hereby corrected as shown below:

In the Claims

In column 9, line 44, in Claim 1, delete "data," and insert -- data --, therefor.

In column 10, line 13 approx., in Claim 1, delete "eludes" and insert -- includes --, therefor.

Signed and Sealed this
Sixteenth Day of June, 2015

Michelle K. Lee
*Director of the United States Patent and Trademark Office*